No. 689,371. Patented Dec. 17, 1901.
R. O. STUTSMAN.
VEHICLE WHEEL.
(Application filed July 16, 1897.)
(No Model.)
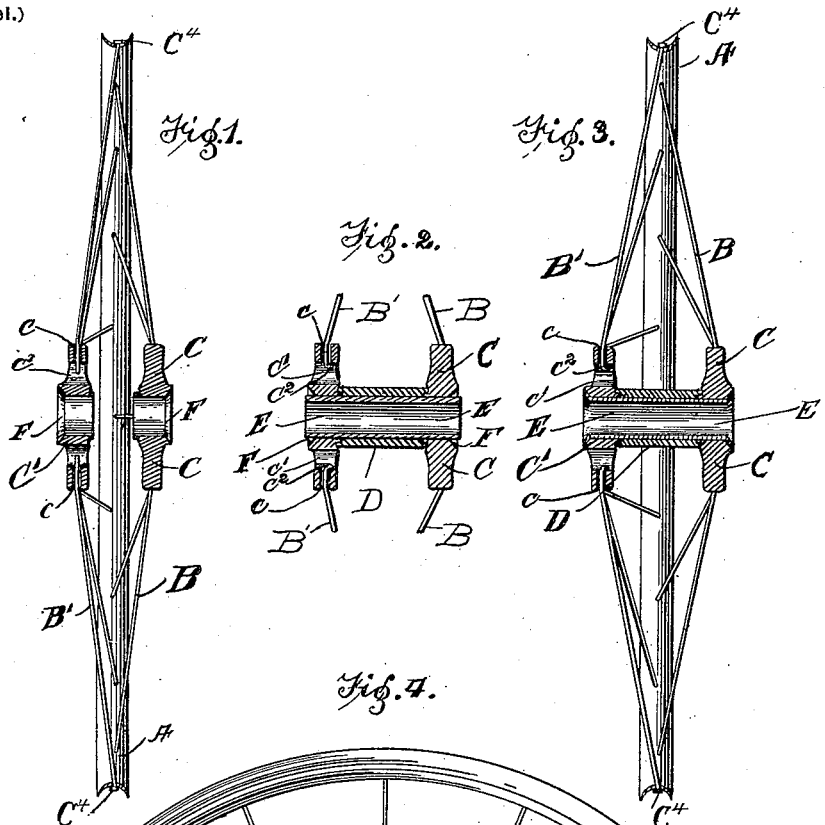
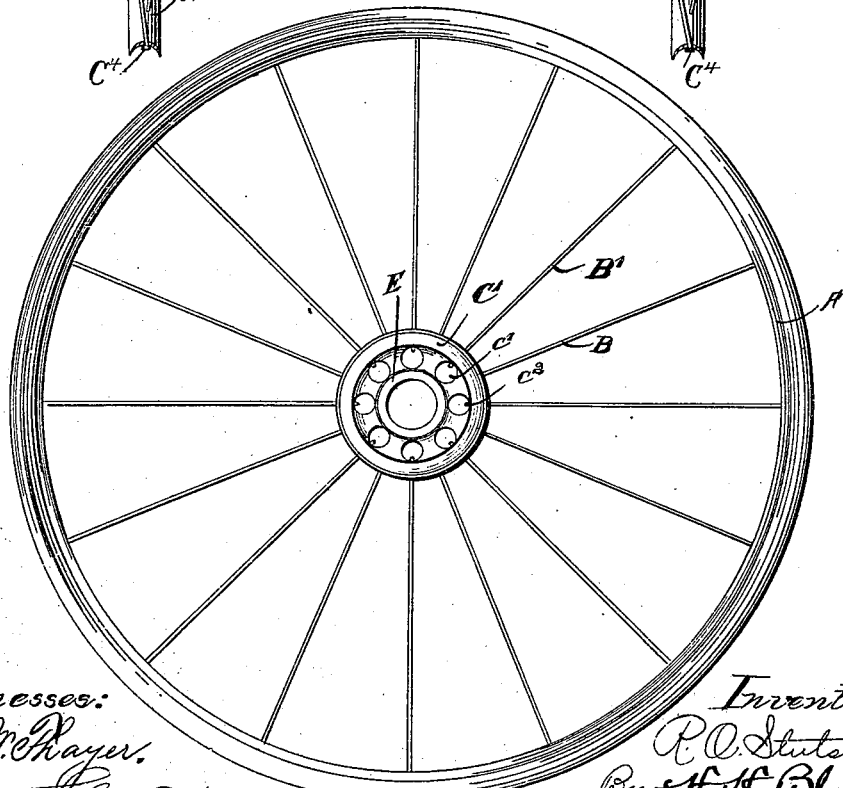

UNITED STATES PATENT OFFICE.

REUBEN O. STUTSMAN, OF DES MOINES, IOWA, ASSIGNOR TO THE BARTHOLOMEW COMPANY, OF DES MOINES, IOWA, A CORPORATION OF IOWA.

VEHICLE-WHEEL.

SPECIFICATION forming part of Letters Patent No. 689,371, dated December 17, 1901.

Application filed July 16, 1897. Serial No. 644,800. (No model.)

*To all whom it may concern:*

Be it known that I, REUBEN O. STUTSMAN, a citizen of the United States, residing at Des Moines, in the county of Polk and State of Iowa, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a vertical transverse section taken immediately after the rim, the spokes, and the hub-pieces have been assembled. Fig. 2 is a vertical section through the hub, showing the parts at the time of the introduction of the inner or skein tube. Fig. 3 is a view similar to Fig. 1 after the parts have been fastened together, and Fig. 4 is a side view of the complete wheel.

The wheel shown in the drawings has a rim at A, which is of the concavo-convex sort now commonly used, particularly in the manufacture of wheels having rubber or pneumatic tires. The spokes are indicated by B B'. Those at B are connected with the central hub-piece C, and the alternate ones at B' are connected with the other hub-piece C'. The spokes at their outer ends $C^4$ are upset or headed and pass from the outer side of the rim through radial apertures $c$ to transverse apertures $c'$ in the hub-plates C C'. The inwardly-projecting ends at $c^2$ are bent in the aperture $c'$, and the metal is flattened or upset in such way as to insure a perfectly firm and uniform fastening. Up to this point the wheel is made in a mechanism which I have devised and by which the tire and the hub-pieces are placed practically perfectly concentric and uniform in distance from each other, and the spokes are firmly secured.

After the manufacture has been carried to the point described I finish the construction of the hub part as follows:

D is a spacing and strengthening tube or thimble which is placed between the disks or hub-plates C C', the latter being preferably shouldered or socketed in such way as to have this tube firmly held and maintained concentrically with the axis.

E is the central or skein tube, smaller in diameter than the tube D, its external diameter being such that it fits snugly in the apertures in the disks C C' and also in the interior of the tube D. The tube D is cut to a length so that it separates the headpieces C C' to such an extent as to give exactly the right tension to the spokes B B', and the tube E is cut to exactly the length that will equal the total width of the hub. At F the hub-plates C C' are rabbeted or flared, and after the tube E has been inserted the metal at its ends is spun, flared, or upset, so as to occupy the chamber of the rabbet or flare at F and in this way is firmly locked itself and in turn binds together the other parts of the hub.

I am aware of the fact that hubs and wheels of various sorts have been heretofore made or proposed each having two spoke-carriers at the inner ends of the spokes and each having a tubular skein of one form or another; but I believe myself to have devised the simple, cheaply-constructed, strong, and durable wheel having the features shown and above described. Thus it has been proposed to bend the inner ends of spokes into grooves or recesses formed in the ends of a tubular hub and to lock the spokes in such grooves or recesses by means of caps or end pieces adapted to engage the ends of the hub and to be rigidly connected together by a tubular core; but in such a construction as that just referred to it was necessary to disconnect the end or cap pieces in order to remove any spoke, whereas in my construction each becomes connected with the hub independently of every other spoke in the series and can therefore be readily removed without affecting the other parts of the wheel. Again, in the earlier construction referred to there was nothing similar to the spacing-tube D herein, by which the disks C C' are properly separated after the spokes have been connected therewith to give the proper tension to the spokes.

What I claim is—

1. A wheel having in combination a rim, a hub-tube, D, two hub-disks on said tube, each disk having a series of radial apertures and a series of apertures or sockets transverse thereto, and spokes each having its inner end passing through one of said radial apertures and then bent into one of said transverse sockets or apertures, substantially as set forth.

2. The combination of the rim, a plurality of hub-disks each having spoke-apertures and an axial aperture, tension-spokes engaging said rim, extending into said spoke-apertures and attached directly to the disks, a transverse skein-tube E fitting in said axial apertures of the disks and engaging the latter to prevent their outward movement, and a spacing-tube having a central aperture surrounding said skein-tube and engaging the inner faces of the disks to prevent their inward movement.

3. The combination of the rim, a plurality of hub-disks each formed of a solid integral piece having spoke-apertures and an axial aperture, tension-spokes engaging the rim, extending into said spoke-apertures and attached directly to said disks, a transverse skein-tube E fitting in said axial apertures and engaging the disks to prevent their outward movement, and a spacing-tube having a central aperture fitting on said skein-tube and engaging the inner faces of said disks to prevent their inward movement.

4. The combination of the rim, a plurality of hub-disks each formed of a solid integral piece having spoke-apertures, an axial aperture and recesses or shoulders on their inner faces, tension-spokes engaging said rim, extending into said spoke-apertures and attached directly to said disks, a transverse skein-tube E fitting in said axial apertures and engaging said disks to prevent their outward movement, and a spacing-tube having a central aperture fitting on said skein-tube and engaging said shoulders on the disks.

5. A wheel having in combination a rim, tension-spokes having their outer ends connected with the rim, hub-disks attached to the inner ends of said spokes, spacing-tube D adapted to be introduced between said disks after the attachment of the spokes as aforesaid to spread said disks and tighten the spokes, said disks and tube being interlocked and centered directly with each other against displacement in radial directions and the transverse skein-tube E passing through said spacing-tube and disks and attached to the latter, substantially as set forth.

6. A wheel having in combination a rim, tension-spokes having their outer ends connected with the rim, hub-disks attached to the inner ends of said spokes, a spacing-tube between said disks, spreading the same and adapted to give said spokes the necessary tension, said disks and tube having at their meeting portions short engaging and centering flanges, whereby said tube may be introduced between the disks after the attachment of the spokes to said rim and disks and may be held in engagement with said disks against displacement in radial directions, and the skein-tube E passing through said spacing-tube and disks and attached to the latter, substantially as set forth.

In testimony whereof I affix my signature in presence of two witnesses.

REUBEN O. STUTSMAN.

Witnesses:
W. G. MILES,
O. T. BLACK.